United States Patent
Li et al.

(10) Patent No.: US 9,144,089 B2
(45) Date of Patent: Sep. 22, 2015

(54) ACCESS METHOD AND SYSTEM FOR MTC DEVICE, AND MTC DEVICE

(75) Inventors: Jing Li, Shenzhen (CN); Xinhui Wang, Shenzhen (CN); Changwei Ke, Shenzhen (CN)

(73) Assignee: ZTE CORPORATION, Shenzhen, Guangdong Providence (CN)

( * ) Notice: Subject to any disclaimer, the term of this patent is extended or adjusted under 35 U.S.C. 154(b) by 12 days.

(21) Appl. No.: 13/574,323

(22) PCT Filed: Apr. 15, 2011

(86) PCT No.: PCT/CN2011/072865
§ 371 (c)(1),
(2), (4) Date: Jul. 31, 2012

(87) PCT Pub. No.: WO2011/143987
PCT Pub. Date: Nov. 24, 2011

(65) Prior Publication Data
US 2013/0051336 A1    Feb. 28, 2013

(30) Foreign Application Priority Data
May 17, 2010  (CN) .......................... 2010 1 0184356

(51) Int. Cl.
*H04W 4/00* (2009.01)
*H04J 3/00* (2006.01)
*H04W 74/08* (2009.01)

(52) U.S. Cl.
CPC ................. *H04W 74/0833* (2013.01)

(58) Field of Classification Search
CPC .............................. H04W 28/04; H04W 72/04
USPC .................................................. 370/329, 336
See application file for complete search history.

(56) References Cited

U.S. PATENT DOCUMENTS 6,778,509 B1    8/2004 Ravishankar
7,330,710 B1 *  2/2008 Xu et al. .................... 455/404.1
(Continued)

FOREIGN PATENT DOCUMENTS

CN    101188863    5/2008
CN    101296521   10/2008

OTHER PUBLICATIONS

3GPP TS 22.368, 3rd Generation Partnership Project Technical Specification Group Services and System Aspects Service requirements for Machine-Type Communications (MTC), Stage 1 Release 11, 1-23.*

(Continued)

*Primary Examiner* — Omar Ghowrwal
*Assistant Examiner* — Angel Brockman
(74) *Attorney, Agent, or Firm* — Pearl Cohen Zedek Latzer Baratz LLP

(57) ABSTRACT

The present invention provides an access method and a system for a Machine-Type Communication (MTC) device, and an MTC device. The method comprises the steps of: an MTC device sending, when performing channel request, a channel request cause value and a random reference value to a Base Station Subsystem (BSS) (100), and the BSS sending the received channel request cause value and random reference value back to the MTC device when completing channel allocation (101). The present invention distinguishes the MTC services from other non-MTC services through the channel request cause value, that is, when the cause values are different, the collision will not occur even if the random reference values are the same, thus reducing the probability of the random reference value collision, implementing the effective management for access operations of large numbers of MTC devices, and avoiding the influence of random reference value collision on the normal implementation of original services.

14 Claims, 2 Drawing Sheets

(56) References Cited

U.S. PATENT DOCUMENTS

2004/0158461 A1* 8/2004 Ramabadran et al. ........ 704/207
2007/0076696 A1* 4/2007 An et al. ........................ 370/352
2010/0040028 A1* 2/2010 Maheshwari et al. ........ 370/336
2011/0105136 A1* 5/2011 Choi .......................... 455/452.1

OTHER PUBLICATIONS

International Search Report for International Application No. PCT/CN20I1I072865 mailed Jul. 21, 2011.

* cited by examiner

ACCESS METHOD AND SYSTEM FOR MTC DEVICE, AND MTC DEVICE

CROSS-REFERENCE TO RELATED APPLICATIONS

This application is a National Phase Application of PCT International Application No. PCT/CN2011/072865, International Date Apr. 15, 2011, claiming priority of Chinese Patent Application No. 201010184356.7, filed May 17, 2010, which is hereby incorporated by reference.

FIELD OF THE INVENTION

The present invention relates to the communication technology of Machine-Type Communication (MTC), and in particular to an access method and system for an MTC device, and an MTC device.

BACKGROUND OF THE INVENTION

With the development of communication technologies, the MTC communication technology has received much attention. The MTC communication technology, which combines data collection, remote monitoring, telecommunication and information technology, can make the service flow automated, integrate the real-time state of Information Technology (IT) system and non-IT equipment in the company, and create value-added services. In the MTC communication system, terminal equipment is referred to as MTC device.

In the present MTC communication technology, as the wireless network side does not provide specialized optimization processing measures for the access operation of an MTC device, the load condition of wireless network resources cannot be taken into consideration during the access of the MTC device. Therefore, the MTC device still tries to access even when the wireless network has no available network resources, which makes the MTC device unable to access the wireless network. Or, even if the MTC device is able to access the wireless network successfully, but in the end, the performance of the wireless network is affected due to excessive number of MTC devices in the wireless network, thereby affecting the normal operations of other MTC devices.

With the unceasing maturation of the MTC communication technology, large numbers of MTC devices will be added to the MTC communication system. If the access operations of the MTC devices are not optimized, there is no doubt that the performance of the wireless network will be affected.

In the prior art, when a mobile terminal accesses the network, the mobile terminal will send a Channel Request message to a Base Station Subsystem (BSS), and at the same time carries a Random Reference cell in the Channel Request message. After channel allocation is finished by the network, the random reference will be carried in an Immediate Assignment message which is sent to the mobile terminal, so that the mobile terminal is able to identify which Immediate Assignment message is sent to the mobile terminal itself. Here, the base station subsystem is the bridge of communication between the mobile terminal and a mobile switching center.

At present, the longest Random Reference specified in the protocol is only 5 bits, so there are only 32 random reference values. In such a way, when large numbers of MTC devices are trying to access the wireless network, there is a case that multiple terminals may use the same random reference value. Therefore, this will cause random reference value collision, and two or more terminals will access the same channel at the same time, so that the service cannot be normally implemented.

SUMMARY OF THE INVENTION

In view of the above, the present invention provides an access method and system for an MTC device, and an MTC device, which can implement the effective management for access operations of large numbers of MTC devices, and avoid the influence of random reference value collision on the normal implementation of original services.

The technical solution of the present invention is implemented as follows.

The present invention provides an access method for an MTC device, comprising the steps of:

an MTC device sending, when performing channel request, a channel request cause value and a random reference value to a BSS; and the BSS sending, after completing channel allocation, the received channel request cause value and random reference value back to the MTC device.

Preferably, the channel request cause value is used to indicate whether or not a cause of the channel request needs to use an MTC service.

Preferably, the channel request cause value is a flag bit or a specified value.

Preferably, the method further comprises the steps of: the MTC device judging whether or not the received channel request cause value and random reference value are the same as the channel request cause value and random reference value sent by the MTC device itself, if so, determining that the received channel request cause value and random reference value are intended to be sent to the MTC device itself, otherwise determining that the received channel request cause value and random reference value are not intended to be sent to the MTC device.

Preferably, the random reference value occupies 5 bits.

Preferably, the random reference value occupies 8 bits, or more than 5 bits.

Preferably, the MTC device sends the channel request cause value and the random reference value to the BSS by carrying the channel request cause value and the random reference value in a Channel Request; and the BSS sends the channel request cause value and the random reference value to the MTC device by carrying the channel request cause value and the random reference value in an Immediate Assignment message.

The present invention also provides an access system for an MTC device, at least comprising an MTC device and a BSS, wherein the MTC device is configured to send, when performing channel request, a channel request cause value and a random reference value to the BSS, wherein the channel request cause value is used to indicate whether or not a cause of the channel request needs to use an MTC service; and the BSS is configured to receive a Channel Request of the MTC device, complete channel allocation, and carry the received channel request cause value and random reference value in a message replied to the MTC device.

Preferably, the MTC device at least comprises a request module and a processing module, wherein the request module is configured to send, when it is required to perform the channel request, the channel request cause value and the random reference value to the BSS by carrying the channel request cause value and the random reference value in the Channel Request message; and the processing module is configured to receive a reply message sent by the BSS, judge whether or not the channel request cause value and random reference value carried in the received reply message are the same as the channel request cause value and random reference value sent by the request module in the Channel Request message, if so, determine that the received reply message is its own message, otherwise, discard the received reply message.

The present invention also provides an MTC device, at least comprising a request module and a processing module, wherein the request module is configured to send, when it is required to perform channel request, a channel request cause value and a random reference value to a BSS, wherein the channel request cause value is configured to indicate whether or not a cause of the channel request needs to use an MTC service;

the processing module is configured to receive a message from the BSS, judge whether or not the channel request cause value and random reference value carried in the received message are the same as the channel request cause value and random reference value sent by the request module in a Channel Request message, if so, determine that the received message is its own message, otherwise, discard the received message.

It can be concluded from the technical solution of the present invention that, the MTC device sends a channel request cause value and a random reference value to a BSS when performing channel request, and the BSS sends the received channel request cause value and random reference value back to the MTC device after completing channel allocation. The present invention distinguishes the MTC services from other non-MTC services through the channel request cause value, that is, when the cause values are different, the collision will not occur even if the random reference values are the same, thus reducing the probability of the random reference value collision, implementing the effective management for access operations of large numbers of MTC devices, and avoiding the influence of random reference value collision on the normal implementation of original services.

DETAILED DESCRIPTION OF THE EMBODIMENTS

Figure 1:
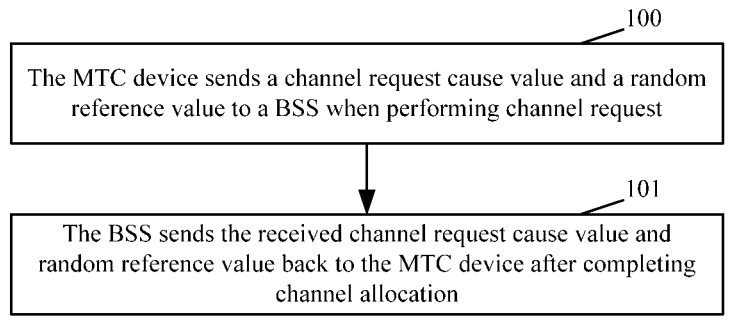
FIG. 1 is a flowchart of an access method for an MTC device in accordance with an embodiment of the present invention.

FIG. 1 is a flowchart of an access method for an MTC device in accordance with an embodiment of the present invention. As shown in FIG. 1, the method comprises the steps as follows.

Step 100: An MTC device sends a random reference value and a channel request cause value of an MTC service to a BSS when performing channel request.

Figure 2:
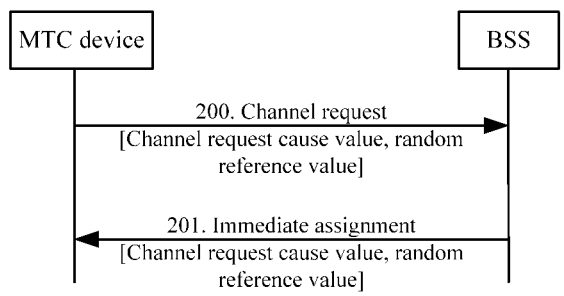
FIG. 2 is a flowchart of an access method for an MTC device in accordance with another embodiment of the present invention.

In this step, the MTC device sends a Channel Request message to the BSS, and the channel request cause value and the random reference value are carried in the Channel Request message simultaneously (Step 200 as shown in FIG. 2). The channel request cause value is configured to indicate that a cause of the channel request needs to use an MTC service, and the random reference value can be a random number.

The channel request cause value can be a flag bit, for example, flag bit 1 indicates that the cause of the channel request needs to use an MTC service, and flag bit 0 indicates that the cause of the channel request needs to use a non-MTC service. The channel request cause value also can be a specified value, for example, indicated through 8 bits (here it is only an example), as shown in Table 1:

TABLE 1

| Bit 8 | Bit 7 | Bit 6 | Bit 5 | Bit 4 | Bit 3 | Bit 2 | Bit 1 | Cause value |
|---|---|---|---|---|---|---|---|---|
| 1 | 1 | 1 | 1 | 1 | 1 | 1 | 1 | MTC service |

In Table 1, taking the fact that the 8 bits are all 1 as an example, when the 8 bits are all 1, the cause of the channel request is that it is needed to use an MTC service.

The embodiment of the present invention distinguishes the MTC services from other non-MTC services through the channel request cause value, that is, when the cause values are different, the collision will not occur even if the random reference values are the same, thus reducing the probability of the random reference value collision, implementing the effective management for access operations of large numbers of MTC devices, and avoiding the influence of random reference value collision on the normal implementation of original services.

The random reference value can be indicated by 5 bits prescribed in the existing protocol.

Further, the random reference value can also be extended to be longer, i.e., more than 5 bits, so as to further reduce the probability of the random reference value collision. For example, the random reference value can be indicated by 8 bits (here it is only an example, for example to distinguish emergent MTC services from non-emergent MTC services), as shown in Table 2:

TABLE 2

| Bit 8 | Bit 7 | Bit 6 | Bit 5 | Bit 4 | Bit 3 | Bit 2 | Bit 1 | Random reference value |
|---|---|---|---|---|---|---|---|---|
| X | X | X | X | X | X | X | X | Random number |

Step 101: The BSS sends the received channel request cause value and random reference value back to the MTC device after completing channel allocation.

After receiving the Channel Request message, the BSS distinguishes the MTC services from other non-MTC services through the channel request cause value, and carries a channel request cause value and a random reference value, which are the same as the received channel request cause value and random reference value, in a replied Immediate Assignment message (Step 201 as shown in FIG. 2). In such a way, the MTC device identifies whether or not the Immediate Assignment message is intended to be sent to the MTC device by judging whether or not the channel request cause value and random reference value carried in the received Immediate Assignment message are the same as the channel request cause value and random reference value sent by the MTC device itself in the Channel Request message.

Figure 3:
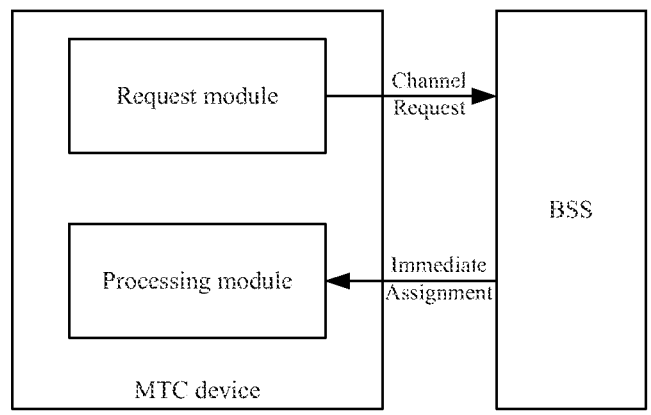
FIG. 3 is a schematic diagram illustrating the structure of an access system for an MTC device in accordance with an embodiment of the present invention.

FIG. 3 is a schematic diagram illustrating the structure of an access system for an MTC device in accordance with an embodiment of the present invention. As shown in FIG. 3, the system at least comprises an MTC device and a BSS, wherein the MTC device is configured to send a channel request cause value and a random reference value to the BSS when performing channel request; and the BSS is configured to receive a Channel Request of the MTC device, complete channel allocation, and send the received channel request cause value and random reference value back to the MTC device.

The MTC device in accordance with an embodiment of the present invention at least comprises a request module and a processing module, wherein the request module is configured to send the channel request cause value and the random reference value to the BSS by carrying them in the Channel Request message when it is required to perform channel request;

the processing module is configured to receive an Immediate Assignment message from the BSS, judge whether or not the channel request cause value and random reference value carried in the received Immediate Assignment message are the same as the channel request cause value and random reference value sent by the request module in the Channel Request message, if so, determine that the received Immediate Assignment message is its own message, otherwise, discard the received Immediate Assignment message.

Figure 4:
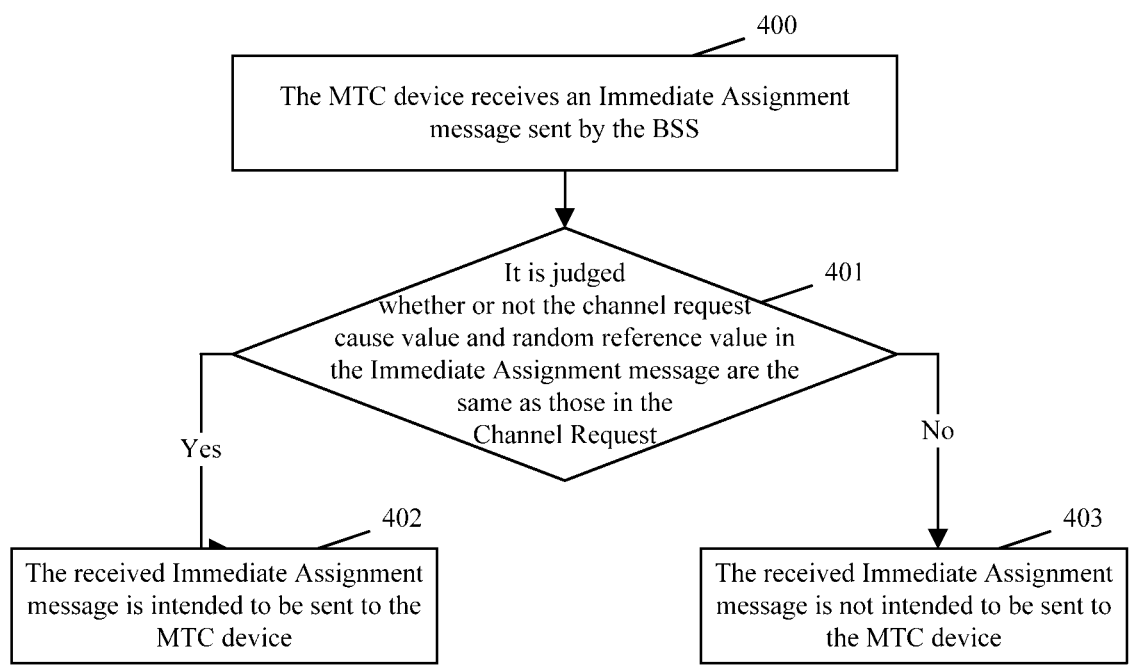
FIG. 4 is a flowchart illustrating a processing flow when an MTC device implements access in accordance with an embodiment of the present invention.

FIG. 4 is a flowchart illustrating a processing flow when an MTC device implements access in accordance with an embodiment of the present invention. As shown in FIG. 4, the processing flow comprises the steps as follows.

Step 400: The MTC device receives an Immediate Assignment message sent by the BSS.

Step 401: It is judged whether or not the channel request cause value and random reference value in the received Immediate Assignment message are the same as the channel request cause value and random reference value sent by the MTC device itself in the Channel Request, if so, proceed to Step 402, otherwise proceed to Step 403.

Step 402: It is determined that the received Immediate Assignment message is intended to be sent to the MTC device itself, end the process.

Step 403: It is determined that the received Immediate Assignment message is not intended to be sent to the MTC device, and the received Immediate Assignment message is discarded.

The above are only the preferable embodiments of the present invention and not intended to limit the scope of protection of the present invention, and any modifications, equivalent replacements, improvements and the like within the principle of the present invention shall fall within the scope of protection of the present invention.

What is claimed is:

1. An access method for a Machine-Type Communication (MTC) device, comprising the steps of:
    an MTC device sending, when performing a channel request, a channel request cause value and a random reference value to a Base Station Subsystem (BSS); and
    the BSS sending, after completing channel allocation, the received channel request cause value and random reference value back to the MTC device;
    the MTC device judging whether or not the received channel request cause value and random reference value are the same as the channel request cause value and random reference value sent by the MTC device itself, if so, determining that the received channel request cause value and random reference value are intended to be sent to the MTC device itself, otherwise determining that the received channel request cause value and random reference value are not intended to be sent to the MTC device;
    wherein the channel request cause value is used to indicate whether or not a cause of the channel request needs to use an MTC service.

2. The access method for the MTC device according to claim 1, wherein the channel request cause value is a flag bit or a specified value.

3. The access method for the MTC device according to claim 2, wherein the random reference value occupies 5 bits.

4. The access method for the MTC device according to claim 2, wherein the random reference value occupies 8 bits, or more than 5 bits.

5. The access method for the MTC device according to claim 1, wherein the random reference value occupies 5 bits.

6. The access method for the MTC device according to claim 1, wherein the random reference value occupies 8 bits, or more than 5 bits.

7. The access method for the MTC device according to claim 1, wherein the MTC device sends the channel request cause value and the random reference value to the BSS by carrying the channel request cause value and the random reference value in a Channel Request; and
    the BSS sends the channel request cause value and the random reference value to the MTC device by carrying the channel request cause value and the random reference value in an Immediate Assignment message.

8. The access method for the MTC device according to claim 1, wherein the random reference value occupies 5 bits.

9. The access method for the MTC device according to claim 1, wherein the random reference value occupies 5 bits.

10. The access method for the MTC device according to claim 1, wherein the random reference value occupies 8 bits, or more than 5 bits.

11. The access method for the MTC device according to claim 1, wherein the random reference value occupies 8 bits, or more than 5 bits.

12. The access method for the MTC device according to claim 1, wherein the MTC device sends the channel request cause value and the random reference value to the BSS by carrying the channel request cause value and the random reference value in a Channel Request; and
    the BSS sends the channel request cause value and the random reference value to the MTC device by carrying the channel request cause value and the random reference value in an Immediate Assignment message.

13. An access system for a Machine-Type Communication (MTC) device, at least comprising an MTC device and a Base Station Subsystem (BSS), wherein
    the MTC device is configured to send, when performing a channel request, a channel request cause value and a random reference value to the BSS, wherein the channel request cause value is used to indicate whether or not a cause of the channel request needs to use an MTC service; and
    the BSS is configured to receive a Channel Request of the MTC device, complete channel allocation, and carry the received channel request cause value and random reference value in a message replied to the MTC device;
    wherein the channel request cause value is used to indicate whether or not a cause of the channel request needs to use an MTC service;
    wherein the MTC device at least comprises a request module and a processing module, wherein the request module is configured to send, when it is required to perform the channel request, the channel request cause value and the random reference value to the BSS by carrying the channel request cause value and the random reference value in the Channel Request message; and the processing module is configured to receive a reply message sent by the BSS, judge whether or not the channel request cause value and random reference value carried in the received reply message are the same as the channel request cause value and random reference value sent by the request module in the Channel Request message, if so, determine that the received reply message is its own message, otherwise, discard the received reply message.

14. A Machine-Type Communication (MTC) device, at least comprising a request module and a processing module, wherein the request module is configured to send, when it is required to perform a channel request, a channel request cause value and a random reference value to a Base Station Subsystem (BSS), wherein the channel request cause value is configured to indicate whether or not a cause of the channel request needs to use an MTC service;

the processing module is configured to receive a message from the BSS, judge whether or not the channel request cause value and random reference value carried in the received message are the same as the channel request cause value and random reference value sent by the request module in a Channel Request message, if so, determine that the received message is its own message, otherwise, discard the received message;

wherein the channel request cause value is used to indicate whether or not a cause of the channel request needs to use an MTC service.

* * * * *